United States Patent [19]

Chi

[11] Patent Number: 5,083,861
[45] Date of Patent: Jan. 28, 1992

[54] APPARATUS FOR MEASURING THE DISTANCE OF A TARGET

[76] Inventor: Chien-Yuan Chi, No. 62, Lane 42, Chung Nan Street, Taipei, Taiwan

[21] Appl. No.: 702,366

[22] Filed: May 15, 1991

Related U.S. Application Data

[63] Continuation of Ser. No. 496,345, Mar. 20, 1990, abandoned.

[51] Int. Cl.⁵ ................................................ G01C 3/08
[52] U.S. Cl. .......................................... 356/5; 342/134
[58] Field of Search ............................ 356/5; 342/134

[56] References Cited

U.S. PATENT DOCUMENTS

| | | | |
|---|---|---|---|
| 4,699,508 | 10/1987 | Bolkow et al. | 356/5 |
| 4,861,159 | 8/1989 | Breen | 356/5 |
| 4,888,477 | 12/1989 | Nankivil | 356/5 |
| 4,895,441 | 1/1990 | Allen | 356/5 |

Primary Examiner—Stephen C. Buczinski
Attorney, Agent, or Firm—Poms, Smith, Lande & Rose

[57] ABSTRACT

An apparatus for measuring the distance of a target includes a circuit arrangement of a transmitting circuit, a first receiving circuit, a second receiving circuit, a charging/discharging circuit, a switching gate, an analog-to-digital converter, a microprocessor, and a monitor. A modulated pulse signal is emitted by the transmitting circuit, and will be received by the first receiving circuit which makes the charging/discharging circuit start being charged. When the modulated pulse signal is reflected from a reflective object, it will be received by the second receiving circuit and the second receiving circuit will send a stop signal to terminate the charge to the capacitor of the charging/discharging circuit. By calculating the time period of the charging time under the control of switching gate, analog-to-digital converter, microprocessor, the distance of a target object is measured. Further, the modulated pulse signal received by second receiving circuit will be received by the microprocessor so as to determine whether the infrared ray received is the originally emitted modulated signal by transmitting circuit.

1 Claim, 3 Drawing Sheets

MICROPROCESSOR

APPARATUS FOR MEASURING THE DISTANCE OF A TARGET

This is a continuation of copending application Ser. No. 07/496,345 filed on March 20, 1990, now abandoned.

BACKGROUND OF THE INVENTION

Prior methods for measuring those high-speed transmission electromagnetic waves, such as radar wave, light wave infrared ray, laser beam, etc., generally include two types: (1) Emitting HF electromagnetic wave or light wave in the form of a pulse, measuring the frequency value between the emission of a pulse and the counting by a counter of the return number of waves, and then converting the value into a time value; or to calculate the time value from the lightspot width indicated by a cathode ray oscillograph. This is known as "pulsed radar" method, and (2) using a given rate to alter the frequency of HF continuous wave, then comparing the frequency of the reflected signal with the frequency of the emission signal. This is known as "frequency-modulated continuous wave radar" method. However, since the speed of the light wave or electromagnetic wave is so quick ($C = 3 \times 10^8$ M/sec.) that a UHF of 300–3,000 MHz or a SHF of 3,000–30,000 MHz, or a much higher frequency is required to measure the time needed by the wave to transmit and reflect back and get an accurate transmission time, this wave is used for a short distance from 1 cm to 100 cm. However, the generation circuit of such UHF of SHF is structured with very expensive components and is subject to very strict environmental restrictions, therefore, it can not be widely applied to normal situations.

SUMMARY OF THE INVENTION

It is therefore a primary object of the present invention to provide a measuring apparatus which is capable of measuring the distance of a target object by calculating the transmission time of infrared ray, laser beams, radar wave, etc. between the target object and the present invention. The present invention is characterized by: (1) a circuit not requiring SHF system, low cost, simple wiring, small in volume, and suitable for a normal environment, and (2) having the function to measure and determine the transmission time of pulses with different frequencies, such as infrared ray, laser beams, radar wave, etc.

BRIEF DESCRIPTION OF THE DRAWINGS

A specific embodiment of the invention will now be described with reference to the accompanying drawings of which.

DETAILED DESCRIPTION OF THE PREFERRED EMBODIMENT

Figure 1:
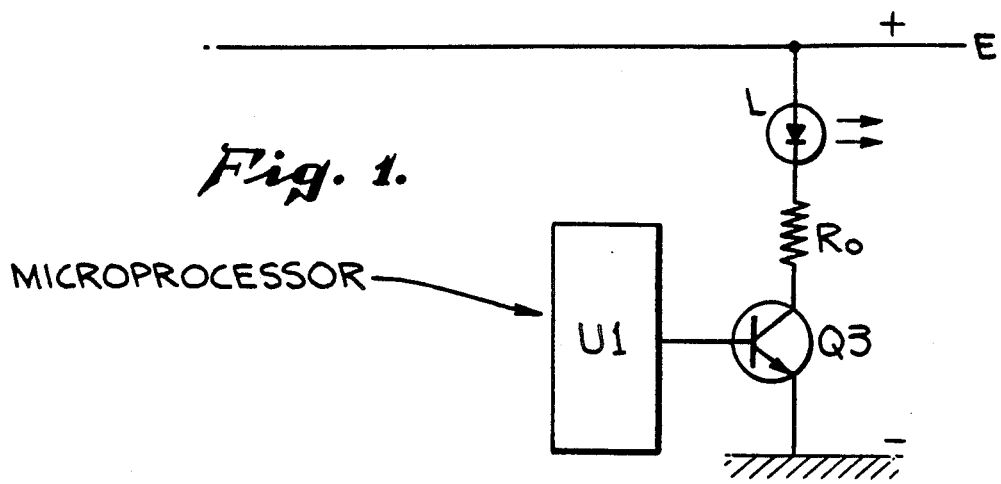
FIG. 1 shows the transmitting circuit of the present invention.

Please refer to FIG. 1. The transmitting circuit of the present invention consists of a transistor Q3, a resistor RO and an infrared light-emitting diode L. A modulated pulse signal is provided from the microprocessor U1 and is amplified by the transistor Q3 to control the infrared emission diode L to emit a modulated infrared pulse signal.

Figure 2:
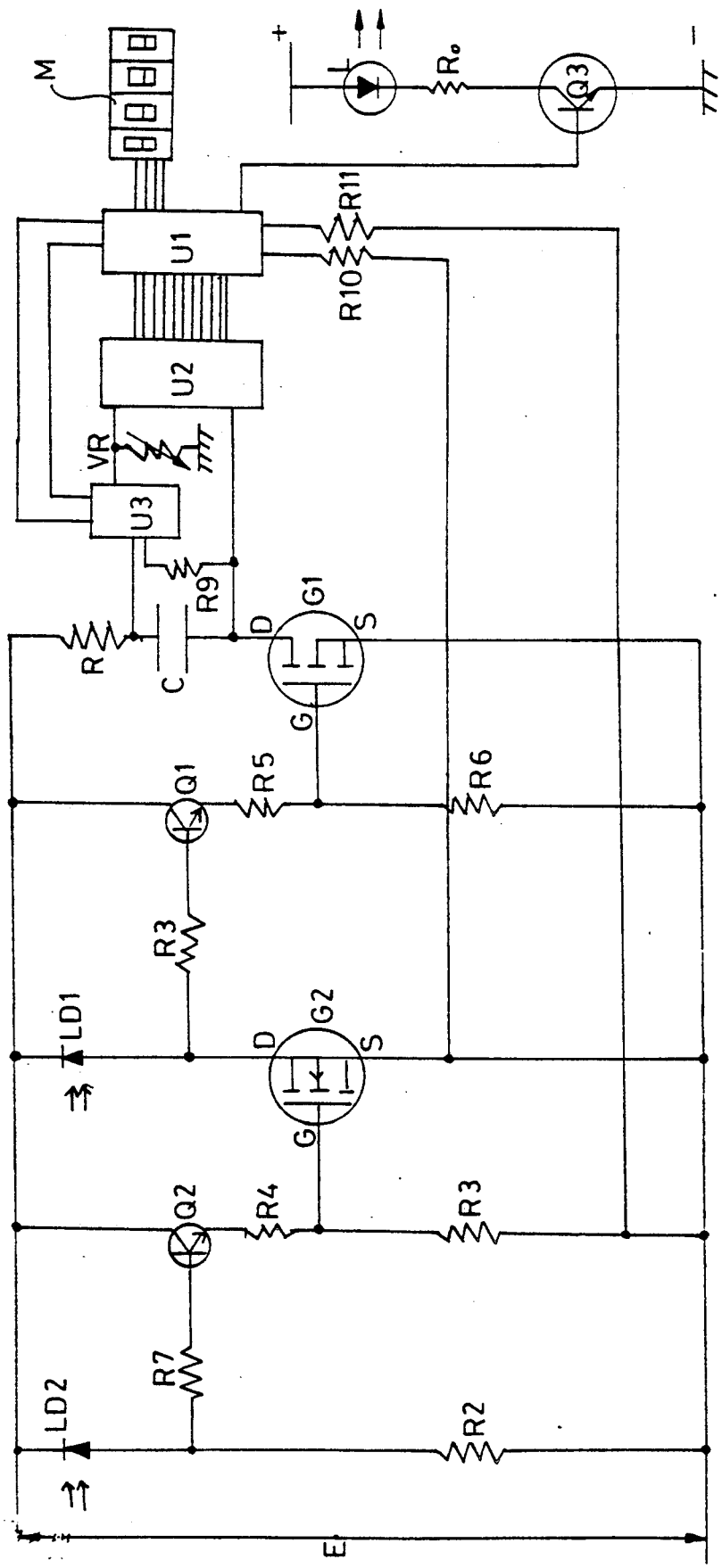
FIG. 2 shows the circuit arrangement of the present invention.

Please refer to FIG. 2 which shows a circuit arrangement of the present invention including a transmitting circuit, a first receiving circuit, a second receiving circuit, a charging/discharging circuit, a switching gate U3, an analog-to-digital converter U2, a microprocessor U1, and a monitor M. In this circuit arrangement, the first receiving circuit consists of first infrared photo detector LD1, resistor R8, R5 and R6, transistor Q1, and first field effect transistor G1; the second receiving circuit consists of second infrared photo detector LD2, resistor R7, R4, R3 and R2, transistor Q2, and second field effect transistor G2; the charging/discharging circuit is composed of a resistor R and a capacitor C connected in series with the first field effect transistor G1.

In operation, the infrared light-emitting diode L of the transmitting circuit will emit a modulated pulse signal under the control of the microprocessor U1. A current flow will flow through the first infrared photo detector LD1, which faces the emiting path, when the first infrared photo detector LD1 detects infrared pulse signal emitted from the infrared light-emitting diode L of the transmitting circuit. This current flows through the Base-Emitter junction of the the transistor Q1 and makes the Collector-Emitter junction thereof conductive; then the Gate-Source junction of the first field effect transistor G1 will be conductive and makes the Drain-Source junction thereof conductive. At this time, a source voltage E will charge the capacitor C; when the infrared ray is reflected back by a reflective object, it will be detected by the second infrared photo detector LD2 which faces the reflection path and allows a current to flow through there. This current flows through the B-E junction of the transistor Q2 and makes current through a C-E junction thereof, then switches on the second field effect transistor G2 so that the D-S junction of the second field effect transistor G2 is conducted; at this time, the current produced by the first receiver infrared photo detector LD1 will flow through the second field effect transistor G2 instead of the transistor Q1 that makes the C-E junction of transistor Q1 an open circuit. When the threshold voltage between the gate G and the source S of the first field effect transistor G1 disappears, it makes D-S junction of the field effect transistor G1 an open circuit. As a result, the charging/discharging circuit will stop charging, and a signal from the field effect transistor G2 will pass the resistor R10 and arrives the microprocessor U1 to inform the same to emit a signal to actuate the switching gate U3 and make the current from the capacitor C of the charging/discharging circuit to the analog-to-digital converter U2, and converts the charged voltage of the capacitor C into a digital signal. The microprocessor U1 will further calculate the charging time t of the capacitor C. This time t represents the transmission time used by the infrared ray from the point it is emitted from the infrared light-emitting diode L to the point it is reflected by a reflective object and is received by the second infrared photo detector LD2. After the microprocessor U1 completes the calculation, it will send the time t to the monitor M for display, meanwhile, it will again send out a signal to the switching gate U3 to actuate another set of gate thereof, so that the voltage of the capacitor C may be discharged through resistor R9. When the C-E junction of the transistor Q2 is made, the microprocessor U1 may also directly receive a modulated pulse signal sent out by the second infrared photo detector LD2 via the transistor Q2 so as to determine whether the infrared ray received by the infrared photo detector LD2 is the originally emitted modulated signal, and further determine the accuracy of the transmission time.

Figure 3:
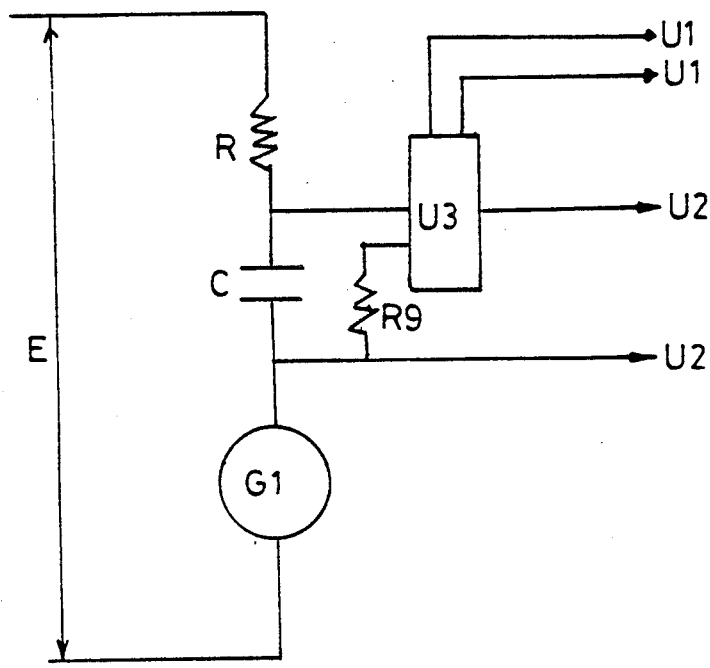
FIG. 3 shows the charging/discharging circuit of the present invention.

Please refer to FIG. 3 which shows the relationship between the charging/discharging circuit and the switching gate U3. As shown therein, when the first field effect transistor G1 is conducted, a source voltage E may directly charge the capacitor C of the charging-/discharging circuit. Suppose the charged voltage of the capacitor C at this time is Vc, then $$Vc = E(1 - e^{\frac{-t}{RC}}), Vr = Ee^{\frac{-t}{RC}}$$

wherein
the Vc is the transient voltage across the capacitor C;
E is the source voltage;
Vr is the transient voltage across the resistance R;
e is a base of a natural logarithm, around 2.718; and
Rc is a time constant, is a product of resistance ($\Omega$) by capacity (f).

When the second field effect transistor G2 is made, charging to the capacitor C is stopped, and the microprocessor U1 will enable the switching gate U3 to send the charged voltage of the capacitor C to the analog-to-digital converter U2 for measuring.

Figure 4:
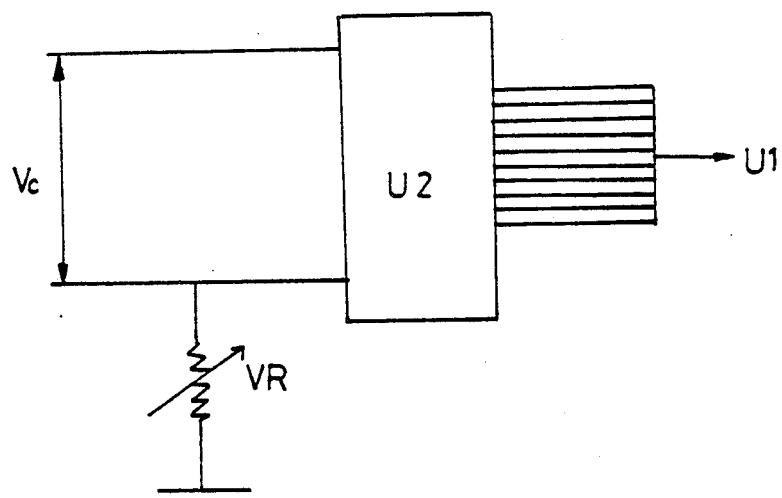
FIG. 4 shows the analog-to-digital converter of the present invention.

Please refer to FIG. 4 which shows the circuit of the analog-to-digital converter. As shown therein, the transient voltage Vc sent out by the capacitor C reaches the analog-to-digital converter U2 and is converted by the same into a digital signal which is then sent to the microprocessor U1 for calculation. In the figure, VR is an adjustable resistance for adjusting the delay time of each element. If a reflective object is put on the location where the infrared light-emitting diode L to directly reflect the light to the second infrared photo detector LD2, so that the same and the first infrared photo detector LD1 may act simultaneously. At this point, a zero value will be displayed on the monitor M. Otherwise, what shown is the delay time of elements and it may be returned to zero by regulating the resistance value of the variable resistor VR.

Figure 5:
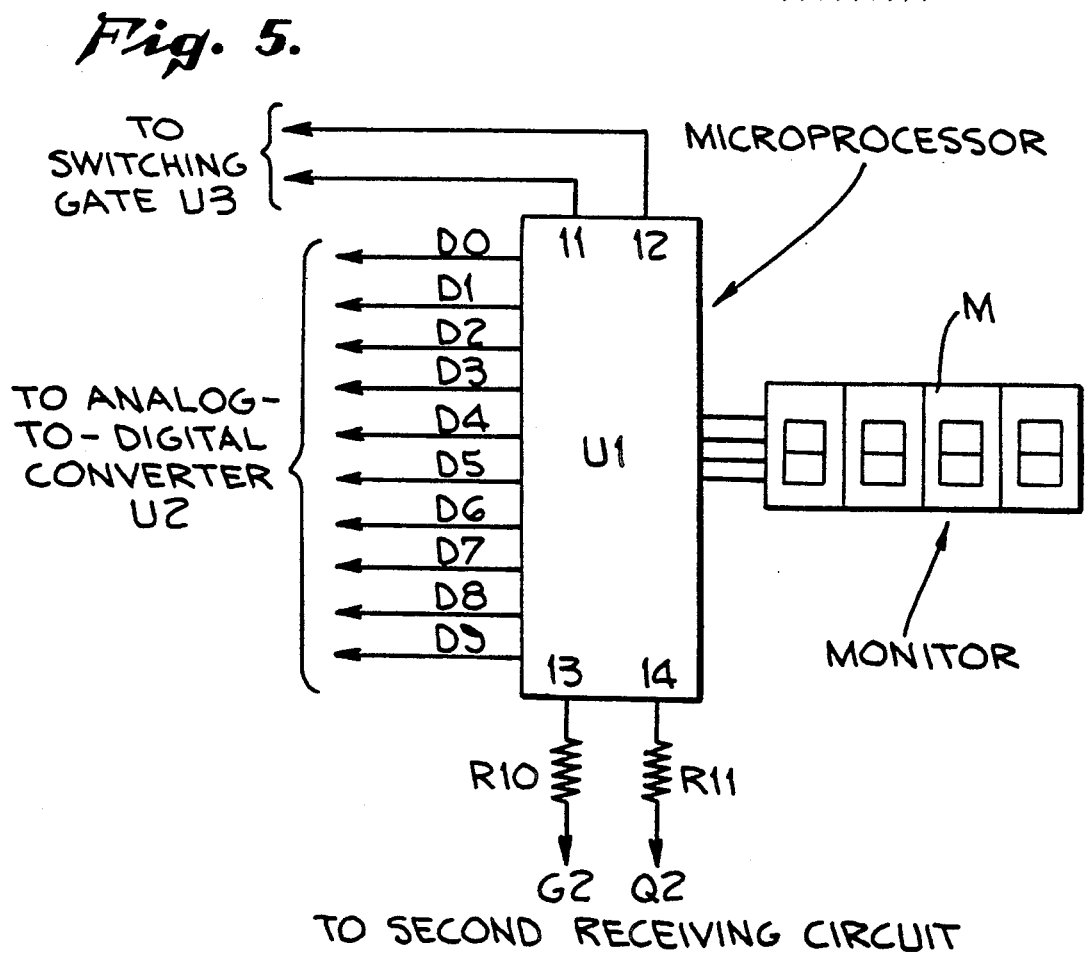
FIG. 5 shows the microprocessor circuit and its control line of the present invention.

Please refer to FIG. 5 which shows the circuit of the microprocessor U1. Data bus D0-D9 is connected to the analog-to-digital converter U2. Control pin labeled 11 of the microprocessor U1 is used to sending signal to control the making of the capacitor C and the analog-to-digital converter U2 by the switching gate U3 so that the analog-to-digital converter U2 can read the charged voltage across the capacitor C; control pin labeled 12 is used to sending signal to control the making of the capacitor C and the resistor R9 by the switching gate U3 so that the charged voltage of capacitor C may be discharged through resistor R9; control pin labeled 13 is used for receiving signal sent by the second field effect transistor G2 so as to determine when to make the capacitor C and the analog-to-digital converter U2 via switching gate U3; and control pin labeled 14 used for receiving the modulated signal sent by infrared photo detector LD2 via transistor Q2 so as to determine whether the infrared ray received by the infrared photo detector LD2 is that emitted by the transmitting circuit itself.

Figure 6:
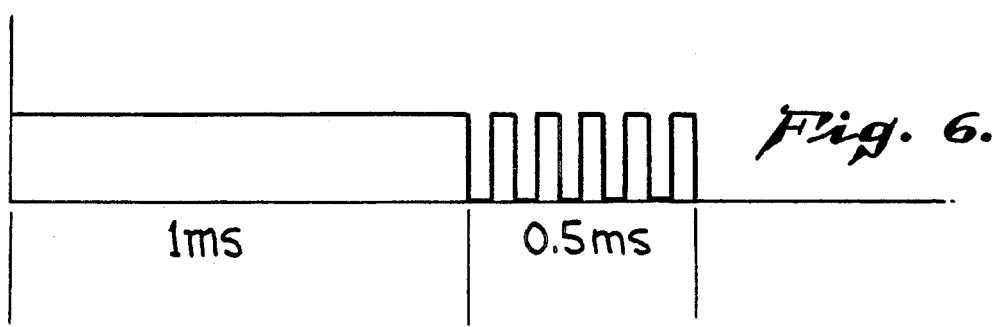
FIG. 6 shows the modulated pulse signal used in the present invention.

Finally, please refer to FIG. 6 which shows the wave form of the modulation mode used by the microprocessor of the invention. As shown therein, what on the left-hand side is 1 ms of continuous wave, and following 0.5 ms is a modulated identification wave, please also refer back to FIG. 2, when the first infrared receiving diode LD1 receives the front end of the continuous wave, the charging circuit will soon start charging and will stop charging when the same wave is reflected back to the second infrared receiving diode LD2. However, the pulse signal may feedback to the microprocessor U1 from the second transistor Q2 via resistor R11 so as to determine whether the wave received is the originally emitted wave. From the Figure, it can be found that a continuous time for wave used to charge must be longer than that consumed by the same wave used to emit and be reflected back, i.e. the transmission time. If the transmission time measured is longer, then the wave for charging should also be lengthened which may be controlled by software of the microprocessor.

The present invention may be applied to various industrial purposes. Some of the examples are to use the capacitive voltage of the circuit to directly drive a decoding motor to indicate time; to drive other motors to perform an auto-focusing of an automatic camera; or to directly send signals to the microprocessor for controlling purpose in order to perform other actions, etc. For all cases that will use two receivers (as the LD1 and LD2 indicated in the present invention) to separately receive a pulse emitted from a electromagnetic source and the same pulse reflected from a reflective object for the purpose to control the charging and discharging time, check and read the transient voltage of the capacitor or resistance, and use the displayed value to achieve the control, measuring, etc., should be included in the scope of the invention.

I claim:

1. An apparatus for measuring the distance of a target by calculating the time period of emitting a modulated pulse signal to the target until receiving a reflected signal from the target back to the measuring apparatus comprising:
   means for transmitting a modulated pulse signal;
   first receiving means having a first photo detector for receiving said modulated pulse signal transmitted by said transmitting means, and a first field effect transistor controlled by said first photo detector to become conductive resulting in a drain-source current;
   second receiving means having a second photo detector connected in series with said first photo detector of said first receiving means for receiving the reflected signal from the target and a second field effect transistor controlled by said second photo detector to become conductive and thus turn off the conduction of said first field effect transistor;
   a charging/discharging circuit means having a capacitor connected in series with a resistor, connected to said first field effect transistor of said first receiving means, said capacitor being charged by said drain-source current when said first field effect transistor becomes conductive and being stopped from charging when said second field effect transistor becomes conductive, resulting in a charged static voltage representing the distance of the target;

an analog-to-digital converter means for converting said charged voltage across the capacitor of said charging/discharging circuit means into a digitized voltage;

a microprocessor for controlling the measuring operation and receiving and processing said digitized voltage which represents the travel time of said modulated pulse signal from the transmitting means to said target; and a switching gate controlling means controlled by said microprocessor, and connected to said charging-/discharging circuit means and to said analog-to-digital converter means for coupling said charged static voltage across said capacitor to said analog-to-digital converter means.

* * * * *